Patented June 27, 1939

2,163,610

UNITED STATES PATENT OFFICE 2,163,610

ADHESIVE COMPOSITIONS

Alexander D. Macdonald, Malden, Mass., assignor to B. B. Chemical Co., Boston, Mass., a corporation of Massachusetts No Drawing. Application December 18, 1935, Serial No. 55,069

5 Claims. (Cl. 260—32)

This invention relates to plastic polymerized chloroprene, and more particularly to liquid adhesive compositions prepared from malodorant-free plastic polymers of chloroprene, and to methods of preparing such compositions.

Plastic polymerized chloroprene is chloroprene (also known as chloro-2-butadiene-1,3) which has been partially poymerized, and is plastic in the sense that it may be worked on the rolls of a rubber mill and compounded with other ingredients in a manner similar to that in which crude rubber is treated. Such plastic polymerized chloroprene may be "cured" to a condition in which it resembles vulcanized rubber. This "curing" is probably a further polymerization of the partially polymerized chloroprene to a more highly polymerized condition, rather than an addition of the polymer to another substance, for example sulphur, such as is considered to occur in the vulcanization of rubber.

Liquid adhesive compositions may be prepared from plastic polymers of chloroprene by forming a colloidal solution thereof in a suitable solvent or solvents, though the distinctly malodorant character of commercial plastic polymers of chloroprene prohibits the use of such adhesive compositions for many purposes.

In order to make feasible the application of plastic polymers of chloroprene to uses otherwise barred by the malodorant character of the commercial polymer, I made the invention disclosed in U. S. Letters Patent No. 2,067,854, granted Jan. 12, 1937, on my copending application, Serial No. 755,852, filed December 3, 1934, wherein I have described a method of deodorizing plastic polymerized chloroprene by imparting to said polymer a surface area relatively large as compared with its mass or volume and subjecting said polymer to the extractive action of a selective solvent for the malodorant constituents thereof, namely, a solvent which will dissolve the malodorant constituents of plastic polymerized chloroprene but which is a non-solvent for the plastic polymer itself. Plastic polymers of chloroprene deodorized in accordance with the method described in said Patent No. 2,067,854, are free from the malodorous characteristics of the ordinary commercial polymer and open the door to uses hitherto barred to the otherwise useful plastic polymer. The deodorized or malodorant-free plastic polymers of chloroprene referred to herein may be prepared in the malodorant-free condition by the above-described or other method.

Objects of this invention are to provide improved vulcanizable liquid adhesive compositions embodying deodorized or malodorant-free plastic polymers of chloroprene, and methods of preparing such compositions.

In the accomplishment of the above and other objects, I have provided by the present invention liquid adhesives embodying malodorant-free or deodorized plastic polymers of chloroprene, which adhesives are capable of being readily "cured" or further polymerized to obtain advantageous properties of "cured" polymerized chloroprene, and yet which have substantial stability and resistance to thickening and gelling prior to use. I have further provided a method of preparing such "vulcanizable" liquid adhesives embodying novel modes of incorporating certain compounding ingredients so as to inhibit premature curing of the plastic polymer and to impart enhanced stability to the liquid adhesive.

An example of a preferred manner of carrying out this invention is as follows:

The liquid adhesive composition whose preparation in accordance with this invention is to be described, is to have associated with the deodorized plastic polymer of chloroprene, and based upon the weight of the polymer, about

| | Per cent |
|---|---|
| Phenyl-beta-naphthylamine | 3 |
| Wood rosin | 5 |
| Light magnesium oxide | 10 |
| Zinc oxide | 5 |
| Sulphur | 3 |

These ingredients are employed to impart improved properties to adhesive bonds later to be formed with the adhesive and to permit rapid and thorough curing of the plastic polymer when disposed in the adhesive joint. There is to be associated with the above solid constituents about one gallon of solvent to two pounds of deodorized plastic plymer. A preferred solvent according to this invention is a mixture of approximately equal volumes of benzene and trichloroethylene. The deodorized plastic polymer of chloroprene itself is preferably the product whose preparation is disclosed in my Patent No. 2,067,854, hereinbefore referred to.

According to one feature of the invention, the compounding of the solid ingredients (with the exception of the sulphur) is carried out by dividing said ingredients into two batches, which may be designated Batch #I and Batch #II. In Batch I are placed (in terms of weight) about one-half of the deodorized plastic polymer of chloroprene, three-quarters of the phenyl-beta-naphthylamine, wood rosin and magnesium oxide, and all of the zinc oxide. In Batch II are placed one-half of the deodorized plastic polymer, one-quarter of the phenyl-beta-naphthylamine, wood rosin, and magnesium oxide, and none of the zinc oxide.

Illustrative compositions of Batches I and II in numerical proportions by weight are as follows:

|  | Batch I | Batch II |
| --- | --- | --- |
|  | Pounds | Pounds |
| Deodorized plastic polymer of chloroprene (prepared in accordance with application Serial No. 755,852) | 39.5 | 39.5 |
| Phenyl-beta-naphthylamine | 1.8 | 0.6 |
| Wood rosin | 3 | 1 |
| Magnesium oxide | 6.2 | 2 |
| Zinc oxide | 3.9 |  |

Batches I and II are milled separately at relatively low temperatures in an ordinary rubber mill. This is conveniently accomplished by water-cooling the rolls of the compounding mill sufficiently to keep the temperature of the ingredients below about 80° F. In the case of each batch, milling for a period of about 20 to 30 minutes is usually sufficient to compound the ingredients. Preferably the compounding is carried out by adding the ingredients to the plastic polymer in the order in which said materials are above listed. After the ingredients have been sufficiently milled the compounded material is sheeted out, for example to a thickness of $\frac{1}{16}''$ to $\frac{1}{8}''$, and cut into small pieces of not more than a few inches square. The compounded material of the batches is now ready to be dissolved in the solvent to form a colloidal solution.

Certain advantages arise by compounding the above ingredients with the deodorized plastic polymer in two batches in the manner described above. Thus, Batch II is milled in the absence of zinc oxide and the plastic polymer of this batch is therefore not subjected to any scorching action by said zinc oxide. Furthermore, by milling the zinc oxide in Batch I with the larger quantity of phenyl-beta-naphthylamine, wood rosin and magnesium oxide, the protective effect of these ingredients results in inhibiting the scorching effect of the zinc oxide to an extent which results ultimately in greater stability of the liquid adhesive composition.

Another feature of the invention involves dissolving the compounded material of the two batches in the solvent as soon as practicable after the compounding, in order to inhibit premature curing of the plastic polymer while the compounded ingredients are in solid condition. Preferably the solution is effected the same day as the milling. In effecting the solution of the above quantities of ingredients, by way of specific example, 38.7 gallons of solvent consisting of equal parts by volume of benzene and trichloroethylene are placed in a water-jacketed and water-cooled churn and agitation commenced. The small pieces of compounded material from the above-described batches are added to the solvent as fast as the previously added pieces are "wet out" by the solvent.

In order to prevent the sulphur from initiating premature curing of the compounded plastic polymer, I add it directly to the material in the churn when the solution has become sufficiently viscous to support the sulphur in suspension. Thus, after all the compounded material has been added to the churn and agitated for about one-half hour, 2.5 pounds of powdered sulphur are added. The churning is continued for about 6 to 8 hours. During the entire solution process the temperature of the liquid composition is maintained below about 80° F. by the cooling water circulating in the jacket of the churn. The addition of sulphur directly to the churn is claimed per se in my copending application, Serial No. 51,114, filed Nov. 22, 1935.

In order to obtain optimum results in brushing the adhesive by hand on leather or other material, I have found that the viscosity of the liquid adhesive solution should be within the range of from 15 to 25 seconds, and preferably from 17 to 22 seconds. Where the adhesive is to be applied by extrusion or other mechanical means, the viscosity of the adhesive may be higher, and up to, for example, 50 seconds. This viscosity refers to the number of seconds required for a steel ball of 9.5 millimeters ($\frac{3}{8}$ inch) diameter and weighing from 3.45 to 3.55 grams to drop 40 centimeters through a sample of the liquid adhesive maintained at 25° C. in a glass tube of 19 millimeters inside diameter.

For the purpose of preparing a composition within the desired viscosity range, it is sometimes practicable to withhold a portion of the solvent used to dissolve the solid constituents of the composition, and then, after a test of the viscosity, to add sufficient solvent to reduce the viscosity to within the desired range. In accordance with a process described and claimed in my application Serial No. 138,631, filed April 23, 1937, which is a division of my copending application, Serial No. 51,114 filed November 22, 1935, the viscosity of the adhesive composition may also be reduced by the addition thereto of a small amount of an alcohol.

Where slow curing of the deodorized plastic polymer of choloroprene is desired, the composition as thus prepared may be used directly for adhesive purposes. If, however, a faster curing of the plastic polymer is desired, a solution of an accelerator in a suitable solvent may be added to the liquid adhesive composition. The accelerator preferably is added not more than 24 hours prior to the actual use of the liquid solution for adhesive purposes, in order that premature curing may not take place. A satisfactory accelerator for this purpose is that known commercially as "du Pont Accelerator #808" and which is a butyraldehyde aniline condensation product. An accelerating solution suitable for the above-described adhesive comprises 1 part by volume of accelerator "#808" dissolved in 9 parts of benzene. A liquid ounce of this accelerating solution may be stirred into a quart of adhesive just prior to use.

In carrying out the adhesion of leather or shoe parts by means of the liquid adhesive composition of this invention, the leather parts are preferably first roughed in a suitable manner, such as by an emery wheel or a wire brush, in order to provide surfaces most advantageous for cementing. The liquid adhesive is then applied preferably to both surfaces to be united. The application of the adhesive may be by brush, by extrusion, or in any other suitable manner. The applied composition is then permitted to dry for a sufficient length of time to remove a major portion of the solvent. At the time of the application of the adhesive to the leather the leather may be water-moistened or, as known in the art, in temper. However, where conditions permit, it is desirable, though not necessary, to have the leather in an air-dry condition. Ordinarily a drying time of not more than about one hour is necessary before the adhesive coated parts may be brought together under attaching pressure. On the other hand, the adhesive may be permitted to dry for a much as 8 to 12 hours before bringing the adhesive coated parts together without seriously affecting the strength of bond. After a suitable drying period as described above, the parts are brought together under attaching pressure, either momentarily or for a longer period. By way of example, in the adhesive attaching of shoe parts an attaching pressure of 80 pounds per square inch has been found satisfactory. Lower attaching pressures may be employed but preferably a relatively high attaching pressure is used.

It will be understood that in manufacturing the new adhesive of my invention other compounding ingredients for plastic polymerized chloroprene than those specifically disclosed may be used, and also other solvents for said plastic polymers, for example, toluene, xylene, carbon tetrachloride, etc.

In so far as they are equivalents, this invention is to be construed sufficiently broadly to cover other halogen polymers of butadiene, for example, bromoprene.

Having described my invention, what I claim as new and desire to secure by Letters Patent of the United States is:

1. The method of preparing a liquid adhesive composition from compounding ingredients including zinc oxide and plastic polymerized chloroprene, which comprises milling all the zinc oxide and a major portion of the other compounding ingredients with a portion of the plastic polymer, separately milling the balance of the compounding ingredients with the remainder of the plastic polymer, and dissolving the separately milled portions of compounded material in a solvent therefor.

2. The method of preparing a liquid adhesive composition from compounding ingredients including zinc oxide, magnesium oxide, and plastic polymerized chloroprene which has been deodorized by means of a selective solvent for the malodorant constituents thereof, which comprises milling all the zinc oxide and a major portion of the magnesium oxide with a portion of the plastic polymer, separately milling the balance of the magnesium oxide with the remainder of the plastic polymer, and dissolving the separately milled portions of compounded material in a solvent.

3. The method of preparing a liquid adhesive composition from compounding ingredients including zinc oxide, magnesium oxide, an anti-oxidant, and plastic polymerized chloroprene which has been deodorized by means of a selective solvent for the malodorant constituents thereof, which method comprises milling about half of the plastic polymer with all of the zinc oxide and a major portion of the magnesium oxide and anti-oxidant, separately milling the remainder of the plastic polymer with the balance of the magnesium oxide and anti-oxidant, and dissolving the separately milled portions of compounded material in a solvent.

4. The method of preparing a liquid adhesive composition from compounding ingredients including zinc oxide, magnesium oxide, phenyl-beta-naphthylamine, and plastic polymerized chloroprene which has been deodorized by means of a selective solvent for the malodorant constituents thereof, which comprises milling about half of the plastic polymer with all of the zinc oxide and about three-quarters of the magnesium oxide and phenyl-beta-naphthylamine, separately milling the remainder of the plastic polymer with the balance of the magnesium oxide and phenyl-beta-naphthylamine, and dissolving the separately milled portions of compounded material in a solvent.

5. The method of preparing liquid adhesive compositions from deodorized plastic polymerized chloroprene and containing wood rosin, phenyl-beta-naphthylamine, magnesium oxide, zinc oxide and sulphur, which comprises milling at low temperature about half of the deodorized polymer with about three-fourths of the wood rosin, phenyl-beta-naphthylamine, and magnesium oxide, and all of the zinc oxide to be associated therewith, and milling at low temperature the remainder of the deodorized plastic polymer with the remainder of the wood rosin, phenyl-beta-naphthylamine and magnesium oxide, and, without permitting it to stand any appreciable time after compounding, dissolving the milled plastic polymer at low temperature in a solvent.

ALEXANDER D. MACDONALD.